No. 860,173. PATENTED JULY 16, 1907.
O. WHITE.
FLOTATION BEARING.
APPLICATION FILED SEPT. 25, 1903.
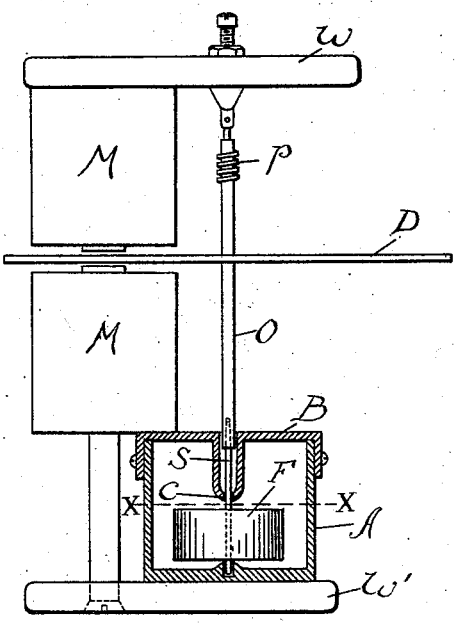
WITNESSES:
INVENTOR
Otis White.
BY
ATTORNEYS

UNITED STATES PATENT OFFICE.

OTIS WHITE, OF SPRINGFIELD, ILLINOIS, ASSIGNOR TO SANGAMO ELECTRIC COMPANY, OF SPRINGFIELD, ILLINOIS, A CORPORATION OF ILLINOIS.

FLOTATION-BEARING.

No. 860,173.  Specification of Letters Patent.  Patented July 16, 1907.

Application filed September 25, 1903. Serial No. 174,569.

*To all whom it may concern:*

Be it known that I, OTIS WHITE, a citizen of the United States, and a resident of Springfield, in the county of Sangamon and State of Illinois, have invented certain new and useful Improvements in Flotation-Bearings, of which the following is a specification.

My invention relates to that class of anti-friction bearings for electric meters, indicating instruments or other appliances in which provision is made for sustaining the spindle or shaft of the instrument upon a float inclosed in a proper chamber and floating in a body of mercury or other liquid.

The special object of my invention is to so construct the device that it may be readily transported without danger of spilling the mercury or other liquid in which the float itself is sustained or buoyed, while at the same time making proper provision for supporting the shaft of the instrument upon said float.

In the accompanying drawings I have shown my invention as carried out in connection with the spindle or shaft for an electric meter from which the application of my invention to other devices will be readily understood.

The drawings illustrate the characteristic parts of an electric meter of simple form in side elevation, while the flotation bearing or support on which the spindle of the meter is stepped are in side elevation and partial vertical section.

O, is the vertical spindle or shaft carrying the torque producing element, D, rotating in a field produced by magnets, M, said disk being, for instance, an aluminium disk, as in some types of alternating current meters.

W', is the base of the instrument, and W, is the arm or bracket which carries the upper magnet, M.

As the details of the meter proper and its principle of operation form no part of the invention, I have shown only so much as would indicate that the shaft or spindle O is a vertical shaft adapted to rotate and by means of a worm, p, or other means rotating with it, to impart movement to a dial train or other integrating appliance.

The parts of the flotation bearing are contained in a suitable cup, A, in which the liquid like mercury may be inclosed to the level, say, of the line x—x, or to such level as will give to the float F a buoyancy adapted to sustain the weight of all the parts carried by the spindle, O, and if desired, to give a slight upward thrust which, however, should be very small. Such upward thrust as exists may be taken up by a thrust bearing at the upper end of shaft O.

The float, F, is preferably made hollow, of copper, and suitably amalgamated. It is secured to a spindle or shaft S, passing through a guide bearing or opening at C, having very slight clearance so that the mercury or liquid may not readily escape. This bearing or guide opens into the cup at a level well below the cover B so that there shall be a chamber provided in which the mercury may lie when the instrument is turned upon its side, or in any position in which it may stand without coming against the opening through which the spindle passes.

The lower end of the shaft may have a suitable guide as indicated which holds the device centrally, but does not afford a support, its only purpose being as a guide.

The shaft O is detachably mounted on the upper end of shaft S as shown, and the friction between the same is sufficient to cause them to rotate together.

When the shaft O rotates, rotation is communicated to the float, F, and as will be seen, the step or bearing for said shaft is in fact the body of mercury in which the float, F, turns. As will be obvious, the level at which the guide bearing or opening, C, should be located would depend upon the amount of mercury which it is designed that the cup A should contain, When properly proportioned there will be no tendency for the mercury to escape around the bearing should the instrument be tipped upon its side during transportation, and hence the instrument when set up for use will operate in the proper way and without any derangement from the change in the amount of flotation for which it has been adjusted in the course of manufacture.

What I claim as my invention is:

The combination with an electric meter shaft carrying a torque producing element rotating in a magnetic field, of a supplemental detached spindle or shaft upon which said meter shaft is detachably supported, a liquid containing chamber having a projection extending downward from its top into the space within said chamber, there being an opening of slight clearance in said projection forming a guide-opening for said supplemental shaft.

Signed at Springfield in the county of Sangamon and State of Illinois this 8th day of September, A. D. 1903.

OTIS WHITE.

Witnesses:
 FRANK PRIDE,
 R. C. LANPHIER.